No. 647,968. Patented Apr. 24, 1900.
W. A. HOLT.
COMBINED SEEDER AND FERTILIZER DISTRIBUTER.
(Application filed Aug. 4, 1899.)

(No Model.) 2 Sheets—Sheet 1.

Witnesses:
Wm W Mitchell
Mary L. Wentworth

Inventor:
Whitman A. Holt
by S. W. Bates
his Atty.

No. 647,968. Patented Apr. 24, 1900.
W. A. HOLT.
COMBINED SEEDER AND FERTILIZER DISTRIBUTER.
(Application filed Aug. 4, 1899.)

(No Model.) 2 Sheets—Sheet 2.

Witnesses:
Inventor:
Whitman A. Holt
by S. W. Bates
his atty.

THE NORRIS PETERS CO., PHOTO-LITHO., WASHINGTON, D. C.

UNITED STATES PATENT OFFICE.

WHITMAN A. HOLT, OF LEWISTON, MAINE, ASSIGNOR, BY MESNE ASSIGNMENTS, TO GEORGE B. BEARCE AND M. J. GOOGIN, OF SAME PLACE, AND J. P. HUTCHINSON, H. G. FOSS, WILLIAM A. ROBINSON, AND W. E. WHITMAN, OF AUBURN, MAINE.

COMBINED SEEDER AND FERTILIZER-DISTRIBUTER.

SPECIFICATION forming part of Letters Patent No. 647,968, dated April 24, 1900.

Application filed August 4, 1899. Serial No. 726,111. (No model.)

*To all whom it may concern:*

Be it known that I, WHITMAN A. HOLT, a citizen of the United States of America, and a resident of Lewiston, Androscoggin county, State of Maine, have invented certain new and useful Improvements in a Combined Seeder and Fertilizer-Distributer, of which the following is a specification.

My invention relates to a combined seeder and fertilizer-distributer, and in the form which is hereinafter shown it is designed to sow grain and grass-seed broadcast, to distribute fertilizer, and also to harrow in the seed. The harrow attachment is also designed to be used as a weeder.

I illustrate my invention by means of the accompanying drawings, in which—

Figure 2:
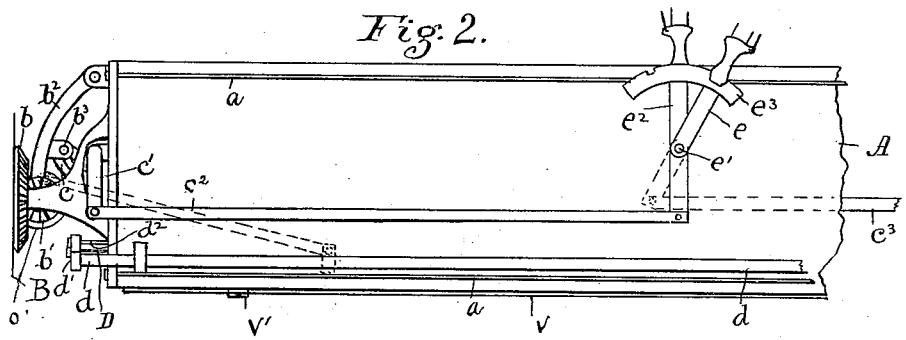
Figure 1:
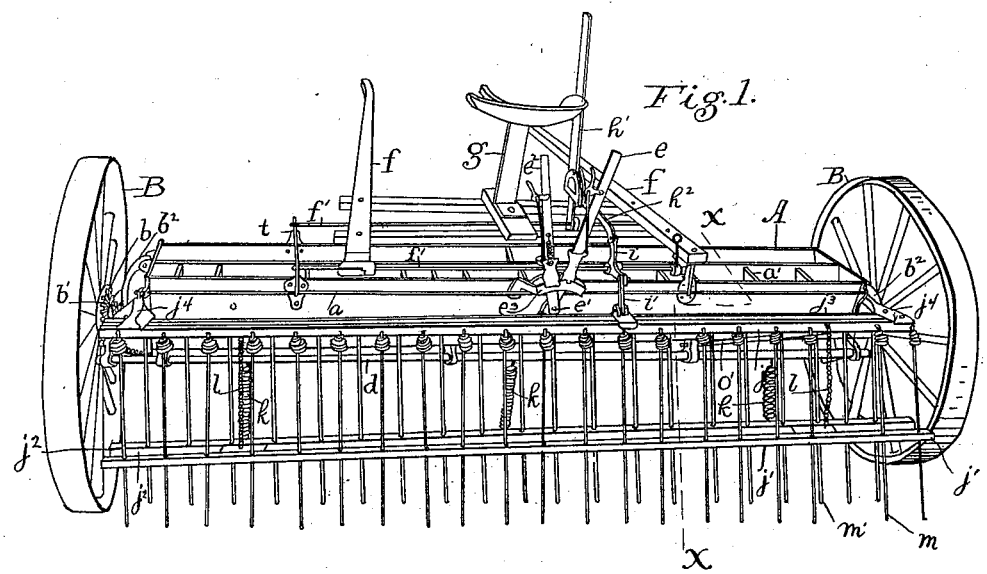
Figure 5:
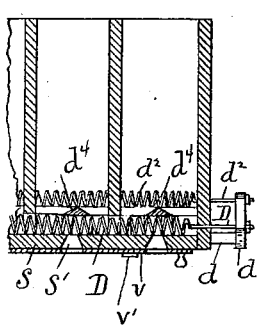
Figure 4:
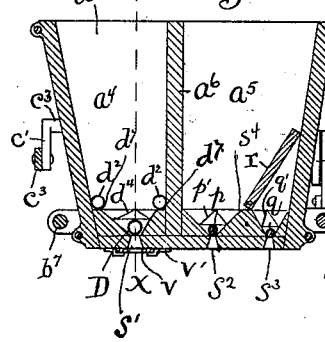
Figure 3:
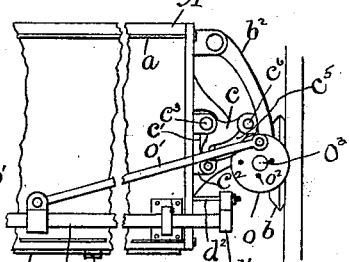
Figure 8:
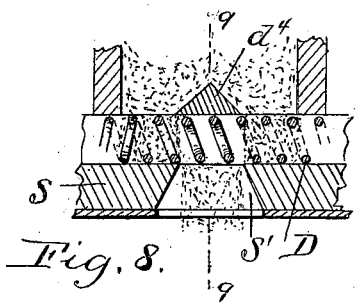
Figure 9:
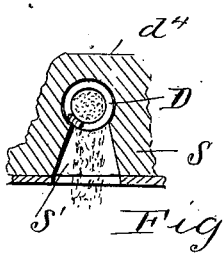
Figure 6:
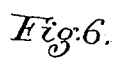
Figure 7:
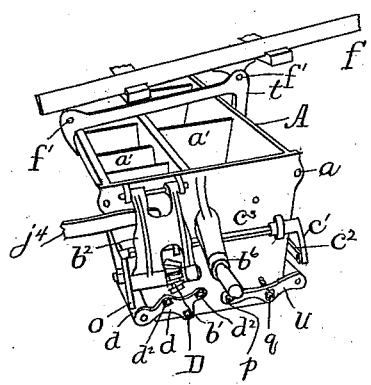
Figure 7:
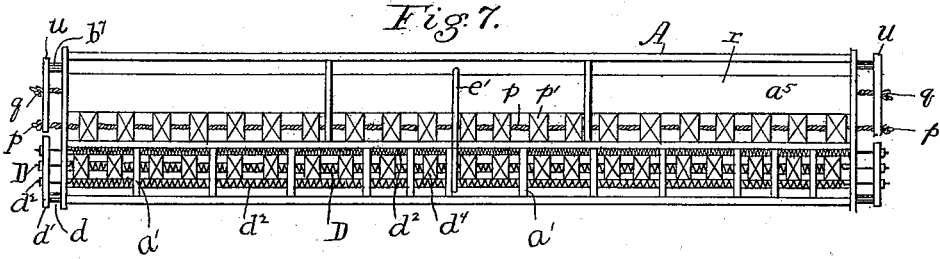

Figure 1 is a general perspective view of the machine looking from the rear. Fig. 2 is a rear view of the hopper with certain parts omitted. Fig. 3 is a part rear elevation of the same, showing one end. Fig. 4 is a section of the hopper, taken at $x\ x$ of Fig. 1. Fig. 5 is a longitudinal section taken at one end of the hopper on the line $x\ x$ of Fig. 4. Fig. 6 is a perspective view of one end of the hopper with the wheel removed. Fig. 7 is a plan of the hopper, showing the arrangements of the several divisions of the same. Fig. 8 is an enlarged detail sectional view showing the helical guide with a charge of fertilizer therein. Fig. 9 is a cross-sectional view on line 9 9 of Fig. 8.

The machine consists of an elongated hopper A, the ends of which are secured together by the rods $a$, the hopper being mounted on wheels B by means of the axles $b^6$, Fig. 6. As here shown, the hopper is divided generally into two main chambers $a^4$ and $a^5$ by a longitudinal partition $a^6$. The chamber $a^4$, which is at the rear of the hopper, is designed to be used for fertilizer, and it is provided with a row of ports $S'$, each of which is covered with a horizontally-perforated block $d^4$, which acts as a regulating device for guiding the passage of the fertilizer to the port. The horizontal opening in the block $d^4$ is on its lower side, and directly over the port and through this opening passes a spiral or helical guide D, shown as a coiled spring, the ends of the spring being straightened and passing through the ends of the hopper. The coiled spring is made to reciprocate lengthwise by means hereinafter shown, and the fertilizer is thus carried in the meshes of the wire into the opening of the block $d^4$ alternately from each side and dropped through the port. It is obvious that by regulating the throw of the coiled spring the amount of fertilizer may be regulated.

The lower portion or bottom of the hopper has sloping sides, and shoulders $d^7$ are formed at the top of the sloping sides on each side, and on these shoulders are other coiled wires $d^2$, which have the same reciprocating movement which the wire D has. These coils stir the fertilizer and cause it to settle down about the ports, where it may be readily introduced into the ports, as described. The chamber is divided into numerous compartments by transverse partitions $a'$, and by putting the fertilizer into one or more of these compartments it can be deposited where it is particularly needed. A shut-off $v$ is mounted on the bottom of the hopper, beneath the ports $S'$, by means of guides $v'$, so that it may be slid longitudinally and so open the ports or close them entirely or in part. This cut-off forms an additional means of regulating the fertilizer, besides the length of movement of the coiled wire.

The chamber $A^5$ has two rows of ports $S^2$ and $S^3$, Fig. 4, separated by a low partition $S^4$, and one or the other row of ports may be cut off by means of a swinging partition $r$, the lower edge of which is pivoted on the top of the partition $S^4$. This partition may be thrown from one side to the other, so that either row of ports can be used. In practice I make one row of ports $S^2$ somewhat larger than the other, $S^3$, using them for grain, while the smaller are used for grass-seed. The grain or grass-seed is discharged through the ports in the same manner as the fertilizer by means of perforated blocks $p'$ and $q'$, placed over the ports; but instead of using coiled wire I use a wire rope $p$ for the ports $S^2$ and a smaller rope $q$ for the ports $S^3$.

The ends of the coiled wires D $d^2$ $d^2$ outside of the hopper are united by yokes $d'$, one at each end of the hopper, and a reciprocating motion is imparted to the yoke by means of a shaft $d$, to the ends of which the yokes are fastened. The shaft is mounted on the rear of the hopper in suitable bearings so that it will slide longitudinally, and it is reciprocated by means of a pitman $o'$, connecting with a crank-disk $o$ on the end of a counter-shaft $o^3$, Fig. 3. On the other end of the counter-shaft is the pinion $b'$, which engages a beveled gear $b$, secured to the driving-wheel B. The pinion $b'$ is thrown in or out of gear by mounting the counter-shaft in the lower end of a hanger $b^2$, said hanger being pivoted by its upper end to the end of the hopper. A slotted cam $c$ is also pivoted to the end of the hopper underneath the hanger $b^2$, a pin $c^6$ on the hanger passing through the slot $c^5$ of the cam. The cam is fixed on a shaft $C^3$, and on the end of the shaft is a crank $c'$, connecting on one end of the hopper with a pitman $c^2$ and on the other end with a pitman $c^3$, extending to the center of the hopper. One of these pitmen $c^3$ controls the pinion shown in Fig. 3, which operates the shaft $d$, which shaft controls the coiled wires, and the other pitman controls the gear shown in Fig. 2, which operates the shaft $b^7$ hereinafter described.

The pitman $c^2$ is controlled by the operating-lever $e^2$, and the pitman $c^3$ is connected with the lever $e$ by means of a shaft $e'$, passing through the hopper, said shaft being shown in Fig. 7 and having on the front side a crank. (Shown in dotted lines in Fig. 2.) Thus by means of the lever $e^2$ the pinion $b'$ may be thrown into or out of gear and the coiled wire D may be operated to discharge the fertilizer or stopped, as desired.

The length of the movement of the coiled wire D, by which more or less fertilizer is fed through the ports, is varied by pivoting the pitman $O'$ in the holes $O^2$, arranged at varying distances from the center of the disk.

The two ropes or cords $p$ and $q$ are reciprocated by mechanism similar in all respects to that described for the coiled springs and are located at the opposite end of the hopper, the parts on one end being duplicated on the other.

The ends of the ropes or cords $p$ and $q$ pass through the ends of the hopper and are secured to yokes $u$, Fig. 6, one on each end of the hopper, Fig. 7, and these yokes are secured on opposite ends of the shaft $b^7$. This shaft is reciprocated by a pitman on the front side of the hopper, (shown in dotted lines in Fig. 2,) connected with the crank-disk $o$.

The machine is provided with a pair of thills $f$ on rod $f'$, which enable them to be moved laterally into different positions. Thus the draft may be from the center of the hopper or on one side, as desired. A seat $g$ of the usual construction is mounted on the thills.

Means are provided for harrowing in the seeds after they have been sown. For this purpose I make use of upright spring-wire teeth $m$ and $m'$, arranged in two rows, as here shown, behind the hopper and parallel thereto. These teeth are secured by their upper ends to a frame $j^3$, Fig. 1, which is pivoted to the ends of the hopper by means of arms $j^4$. The tension or stiffness of these teeth is regulated by means of horizontal bars $j'$ and $j^2$, through which the teeth pass loosely and which are secured at varying heights on the teeth by means of chains or cords $l$. When the bars $j'$ and $j^2$ are up near the top of the teeth, the spring-teeth draw lightly over the ground and serve as weeders; but when the bars are down, as shown in Fig. 1, the teeth are stiff and serve to harrow in the grain and fertilizer. Springs $k$ are provided, connecting the bars $j'$ and $j^2$ with the hopper, so as to provide for the yielding of the teeth when any obstruction is met with. The frame $j^3$ is raised and lowered by means of an operating-lever $h'$, connecting with the frame by a pitman $h^2$, bell-lever $i$, and pitman $i'$.

It will be seen that the machine may be used for sowing broadcast any two different kinds of seed smaller than corn together with the fertilizer and harrowing in the seed thus sown, and it may also be used as a weeder by raising the bars $j'$ and $j^2$ to their highest position.

It will be seen that the machine is capable of sowing phosphate, grain, or grass-seed, or any two kinds of seed either all together or separately.

I claim—

1. In a combined seeder and fertilizer-distributer the combination of an elongated hopper mounted on wheels, ports in the bottom of said hopper, perforated blocks over said ports, a spiral guide extending over said ports and through said blocks, the ends of said guide passing through the end of said hopper, cross-heads to which the ends of said guide are secured, a longitudinally-movable shaft mounted on the outside of said hopper connecting with said cross-heads, a pitman connecting with said shaft and a crank-disk for operating said pitman, a counter-shaft on the end of which said crank-disk is secured, a hanger on the lower end of which said counter-shaft is journaled, a pinion on said counter-shaft, a gear on the driving-wheel of the machine, adapted to engage said pinion and means for swinging said hanger toward and away from said gear to engage and disengage said pinion.

2. In a combined seeder and fertilizer-distributer the combination of an elongated hopper mounted on wheels, ports in the bottom of said hopper, perforated blocks over said ports, a spiral guide extending over said ports and through said blocks, the ends of said guide passing through the ends of said hopper, cross-heads to which the ends of said guides are secured, a longitudinally-movable shaft mounted on the outside of said hopper connecting with said cross-heads, a pitman connecting with said shaft and a crank-disk for operating said pitman, a counter-shaft on the end of which said crank-disk is secured, a hanger on the lower end of which said counter-shaft is journaled, a pinion on said counter-shaft, a gear on the driving-wheel of the machine adapted to engage said pinion, a slotted cam pivoted at the end of the hopper, connected with the lower end of said hanger to throw the same in and out and a system of levers for operating said cam.

3. In a fertilizer-distributer the combination of a hopper having in the bottom thereof a series of ports, blocks covering said ports and having horizontal perforations communicating with said ports, a helical wire guide passing through and fitting said perforations and means for reciprocating said guide longitudinally, whereby the fertilizer enters between the coils of the guide and a definite quantity thereof is carried to the discharge-port.

Signed by me at Portland, Maine, this 20th day of July, 1899.

WHITMAN A. HOLT.

Witnesses:
S. W. BATES,
L. M. GODFREY.